G. E. SMITH.
STEERING POST BEARING.
APPLICATION FILED JAN. 8, 1917.

1,339,987.

Patented May 11, 1920.

Grant E. Smith, Inventor,
By his Attorneys,
Emery, Booth, Janney & Varney

UNITED STATES PATENT OFFICE.

GRANT E. SMITH, OF POUGHKEEPSIE, NEW YORK, ASSIGNOR TO POUVAILSMITH CORPORATION, OF POUGHKEEPSIE, NEW YORK, A CORPORATION OF NEW YORK.

STEERING-POST BEARING.

1,339,987. Specification of Letters Patent. Patented May 11, 1920.

Original application filed August 25, 1916, Serial No. 116,761. Divided and this application filed January 8, 1917. Serial No. 141,180.

*To all whom it may concern:*

Be it known that I, GRANT E. SMITH, a citizen of the United States, and a resident of Poughkeepsie, in the county of Dutchess and State of New York, have invented an Improvement in Steering-Post Bearings, of which the following is a specification.

This invention relates to a combined bearing and slip-ring, more particularly for steering wheel posts for automobiles. This application is a division of my application Serial No. 116,761, filed August 25, 1916, patented January 23, 1917, No. 1,213,811. Steering wheel posts have heretofore generally been cast from suitable metal and thereafter machined to size or drawn from metal to form a tubular post, and in practice considerable inconvenience has existed in assembling this post with its associated parts, either on account of the tubular post having sprung or become bent even slightly or on account of the difficulty of casting and machining, or drawing the same to exact size to fit the adjacent parts.

The principal object of the invention covered in this divisional application is to provide a bearing for a steering shaft, the bearing maintaining the shaft in rigid and proper alinement at all times and particularly during shipping, and at the same time serving to support and insulate a slip-ring or commutator forming part of an electrical circuit to the steering wheel. Other objects will be in part obvious and in part pointed out hereinafter.

The invention accordingly comprises the features of construction and operation, combinations of elements, arrangements of parts and sequence of steps which are exemplified in the structure hereinafter described and the scope of the application of which will be indicated in the following claims.

Figure 1:
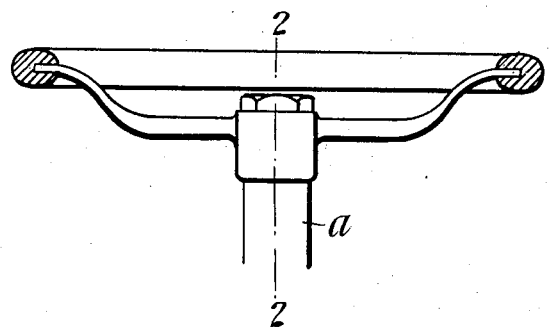

In the accompanying drawings, in which is shown one embodiment of this invention, Figure 1 is a side elevation, partly in section, of the upper part of a steering wheel post.

Figure 2:
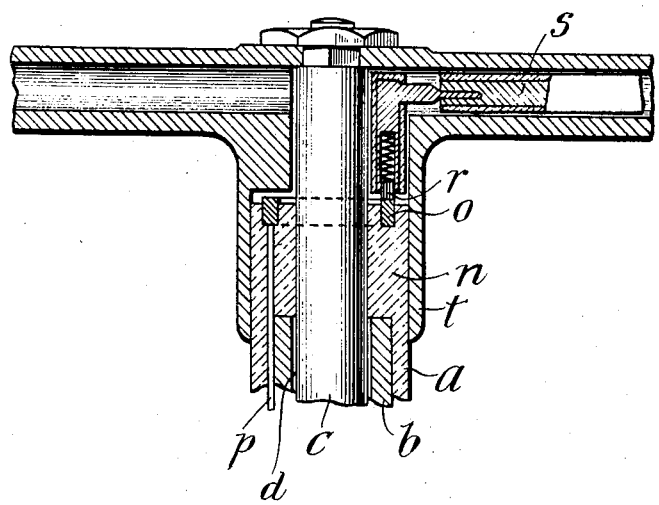

Fig. 2 is a longitudinal section on the line 2—2 of Fig. 1.

Similar reference characters indicate corresponding parts throughout both views of the drawings.

The principal object of the invention covered in this divisional application may be accomplished by the use of a plastic material for the upper bearing of the steering wheel post, such material being preferably condensite or bakelite or one of the condensation products of phenol and formaldehyde. These substances may be readily molded to exact size and thereafter hardened by suitable heat treatment. When so molded and hardened to form a bearing, such materials produce a structure of great inherent rigidity, admirably adapted to hold its shape, and in such a structure the advantages of a heavier bearing are provided without excessive cost, while the disadvantages of other types of bearings are entirely eliminated. Moreover, by embedding in the molded material the slip-ring or commutator, as presently described, a bearing of added strength can be produced.

As shown in the drawings, plastic material $a$ is preferably, though as at present believed not essentially, molded upon a wooden core $b$. This wooden core may be of material assistance in molding the plastic material, and it will, to a certain extent, effect an economy in manufacture because less plastic material may be required when a wooden core is used. The condensite or like material permeates the wood of the core, thereby greatly strengthening the core and so unites itself to the wood during the molding process that a substantially integral steering post is formed. The wooden core may be tubular or solid when the molding is effected, and if solid it is subsequently bored to receive a steering shaft $c$, and to provide a slight clearance as indicated at $d$.

The wire $p$ extending from the lower part of the post to the slip-ring $o$ previously referred to may be embedded in the plastic material, preferably to lie longitudinally of the post, as shown. As a preferred method of embedding the wires in the plastic material of the post, they may be first laid upon or attached to the preferably wooden core $b$ in the positions which they are to occupy permanently, before the plastic material is applied thereto. The subsequent covering of the core with the plastic material and the molding of the same thereon secures the wires permanently in position and not only covers and protects them but may thoroughly and completely insulate them electrically. It may be entirely feasible in view of the insulating properties of the plastic material to embed bare wires in the post to form the several electrical circuits.

Suitable switches (not shown) to control the several electrical circuits may be mounted upon the steering wheel post as disclosed in the parent application, and suitable outlets for the circuits may be provided by binding-posts (not shown) located preferably at the base of the column.

The appropriate connections may be made between the slip-ring $o$ and the wire $p$, preferably before the plastic material is molded about the wooden core. In the finished structure, the slip-ring may be completely insulated by the plastic material molded around it.

When the post is assembled, as described in the parent application, the upper end of the shaft $c$ is journaled in the post. To form a suitable bearing, the plastic material of the post may extend inwardly beyond the wooden core at $n$, the shaft being thereby journaled directly upon and against the plastic material.

An electrical circuit may be provided for heating the steering wheel $t$ or for locating upon the steering wheel rim a suitable switch button for closing a horn circuit and the means for completing the circuit are herein provided as follows: the heating coil or horn button not being shown in the drawings. The slip-ring $o$ may be connected to the wire $p$ leading to a corresponding binding-post located at the base of the column. The ring $o$ may be embedded in the plastic material at the top of the steering wheel post and a brush $r$ which is electrically connected to the heating coil or horn button by a wire $s$, may be so mounted that as the wheel turns it will always maintain its contact with the ring. The return circuit may be through the steering wheel shaft to ground. The wheel $t$ may be of insulating material if desired.

In the claims which follow, the word "condensite" is used to refer generally to any plastic material capable of being molded to exact size and thereafter forming a rigid hardened insulating material. It is to be understood that the invention may be variously embodied and modified within the scope of the subjoined claims.

Having thus revealed my invention, I claim and desire to secure by Letters Patent of the United States:

1. A bearing comprising the combination of molded plastic material apertured to receive a steering shaft revoluble with respect thereto and having a cylindrical outer surface to receive the flange of a steering wheel secured to the shaft, a collector-ring embedded in the material and insulated thereby and presenting an exposed surface for contact with a brush carried by the steering wheel.

2. In apparatus of the class described, the combination of a bearing of molded plastic material, a steering wheel shaft passing therethough, a steering wheel provided with a flange extending around the outside of the bearing, an electrical collector-ring embedded in the bearing and presenting an annular exposed surface, and a brush on the steering wheel spring-pressed against said surface whereby electrical contact is made between the collector-ring and the brush in all positions of the steering wheel.

3. In apparatus of the class described, the combination of a steering wheel, a steering shaft secured thereto, a bearing for wheel and shaft, said bearing being composed of molded plastic material, a collector-ring embedded in the bearing, and a brush on the steering wheel contacting with the ring in all positions of the steering wheel.

In testimony whereof I have signed my name to this specification this 5th day of January, 1917.

GRANT E. SMITH.